Dec. 17, 1935.  E. GRAY  2,024,688
LOCOMOTIVE TRUCK
Filed May 15, 1933  4 Sheets-Sheet 1

INVENTOR
EDWARD GRAY
BY
ATTORNEYS

Dec. 17, 1935.　　　　　E. GRAY　　　　　2,024,688

LOCOMOTIVE TRUCK

Filed May 15, 1933　　　　4 Sheets-Sheet 2

INVENTOR
EDWARD GRAY.
BY
ATTORNEYS

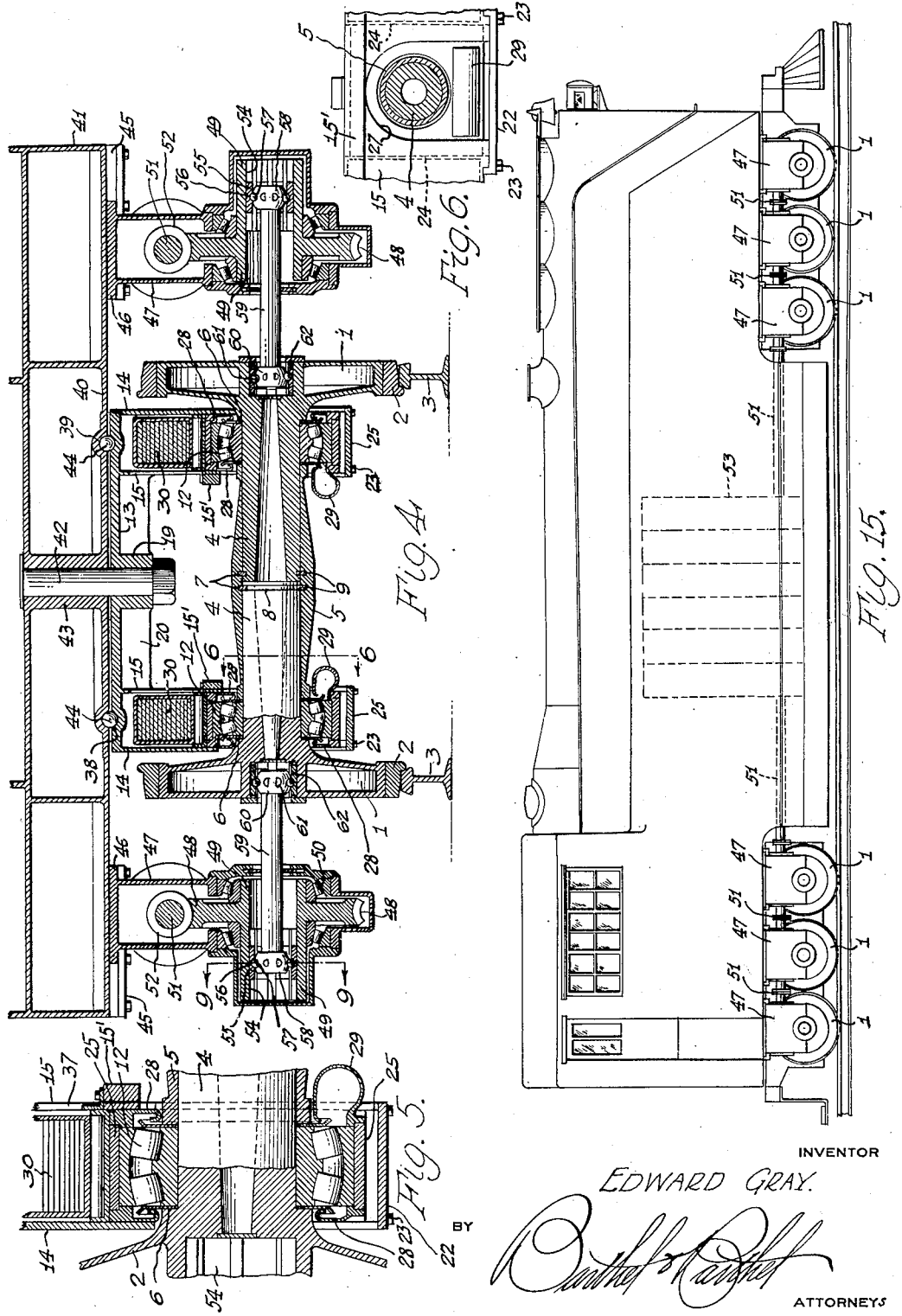

Dec. 17, 1935.  E. GRAY  2,024,688
LOCOMOTIVE TRUCK
Filed May 15, 1933  4 Sheets-Sheet 4
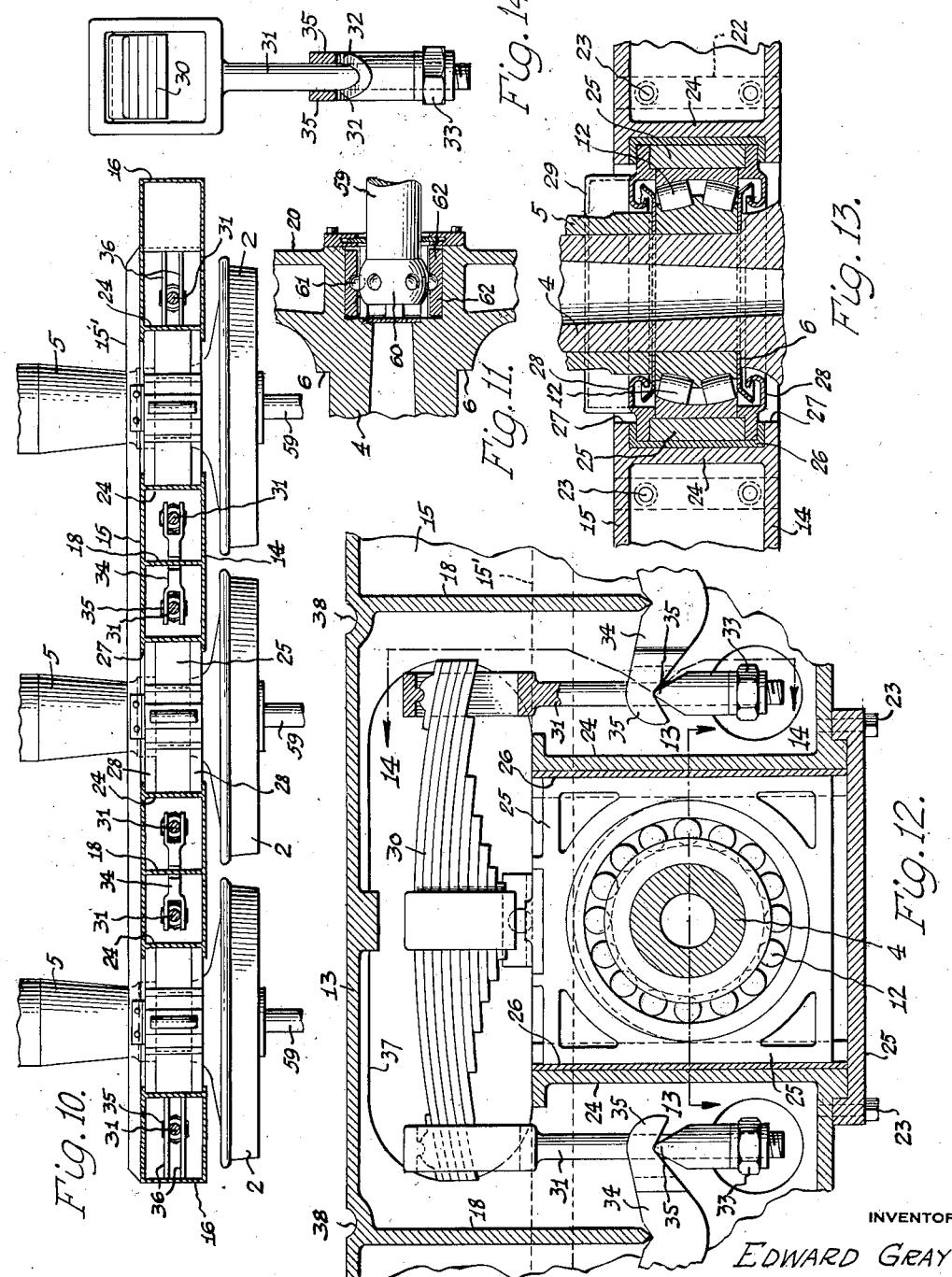
INVENTOR
EDWARD GRAY
BY
ATTORNEYS Patented Dec. 17, 1935

2,024,688

UNITED STATES PATENT OFFICE 2,024,688

LOCOMOTIVE TRUCK

Edward Gray, Detroit, Mich.

Application May 15, 1933, Serial No. 671,179

9 Claims. (Cl. 105—98)

The present invention pertains to a novel railway truck of a type particularly adapted for use as a part of a locomotive having a power plant and includes means for receiving driving torque from a drive member and for transferring such torque to drive wheels on the truck.

The primary object of the present invention is to provide a railway truck including supporting wheels for receiving driving torque from a drive member and a novel mechanism for supporting the wheels so that the supporting mechanism and bearings for the wheels are adequately lubricated and protected from foreign matter, such as the elements, dust, grit or cinders, and so that the wheels, bearings, and supporting mechanism may be easily assembled or dismantled for the purpose of inspection, repairs, and adjustments.

Another object of the present invention is to provide a locomotive truck, embodying the above mentioned desirable features, which is of extremely light weight and which is rugged and durable.

Another object of the present invention is to provide a locomotive truck including a plurality of sets of wheels located on opposite sides of the truck with the wheels on one side of the truck rotatable independently of the wheels on the other side.

Another object of the present invention is to provide a locomotive truck with independently rotatable wheels on opposite sides thereof and torque transfer parts associated with the wheels to separately drive each wheel, the transfer parts including a drive member connected to a wheel so that its axis of rotation is in direct co-axial alignment with the axis of rotation of the wheel, the driving member being connected to the wheel and the torque transfer parts in a manner to permit relative movement of the axes of the drive member and wheel out of alignment without disturbing the driving connection. The axes of the drive member and the wheel are ordinarily moved out of alignment only under conditions that do not normally exist, such as when the locomotive is rounding a bend in the tracks or when the wheels contact with a frog, a joint in the track, etc.

With the above and other ends in view the invention consists in matters hereinafter set forth and more particularly pointed out in the appended claims, reference being had to the accompanying drawings, in which—

Fig. 4 is a transverse central vertical cross section;

Fig. 5 is an enlarged sectional detail of one of the axle bearings;

Fig. 6 is a cross section taken on the line 6—6 of Figure 4;

Fig. 7 is a sectional detail of parts associated with the axles;

Fig. 8 is a transverse section relative to Figure 7;

Fig. 9 is a transverse sectional detail of the wheel hub taken on the line 9—9 of Figure 4;

Fig. 10 is a cross section taken on the line 10—10 of Figure 3;

Fig. 11 is a longitudinal sectional detail of a wheel hub;

Fig. 12 is an enlarged sectional view of a wheel bearing, illustrating the spring suspension therefor;

Fig. 13 is a cross section taken on the line 13—13 of Figure 12;

Fig. 14 is a view taken on the line 14—14 of Figure 12, and

Fig. 15 is a side elevation of a locomotive with trucks constructed in accordance with the present invention associated therewith.

Like characters of reference are employed throughout to designate corresponding parts.

Figure 1:
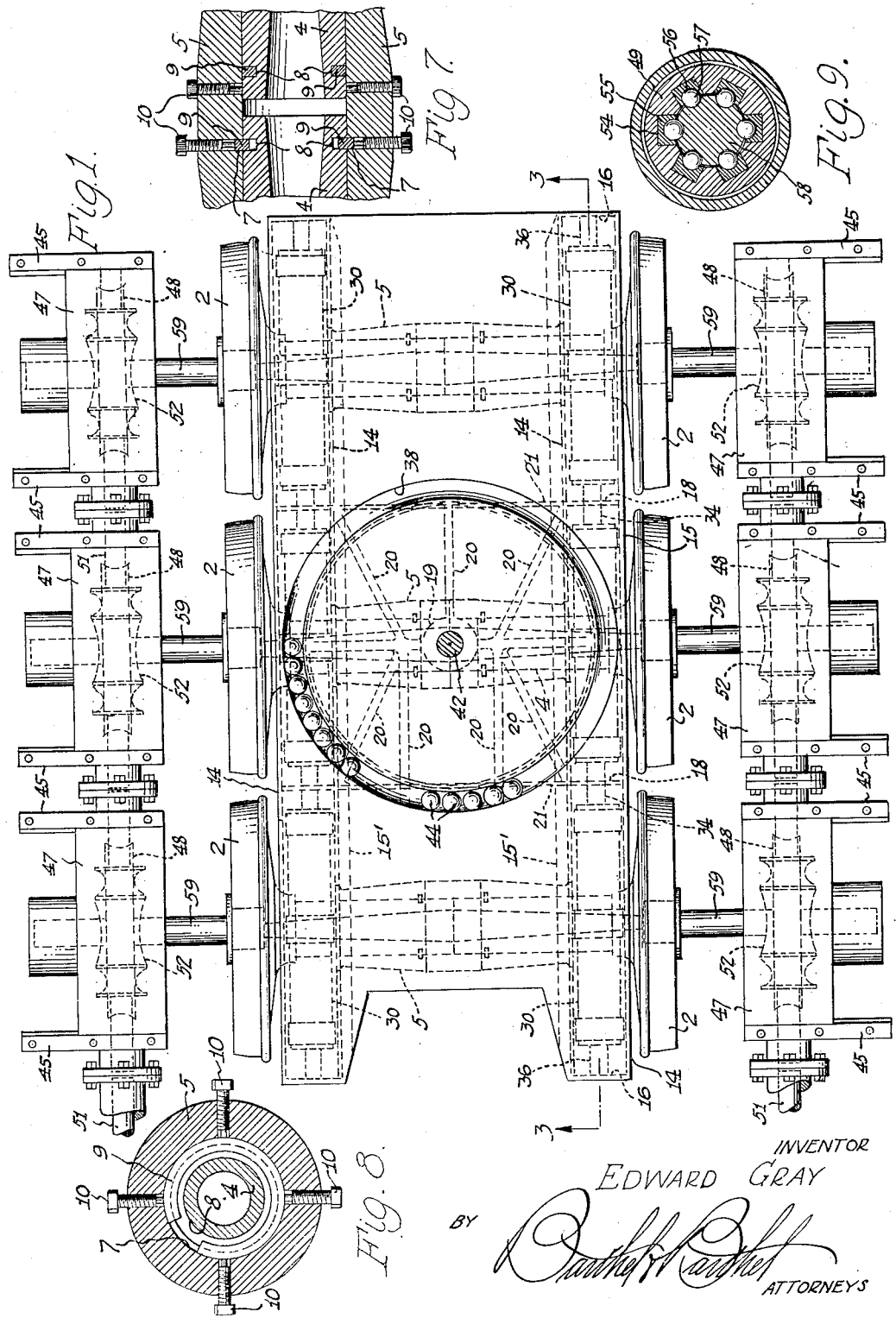
Figure 1 is a top plan view of the present truck, illustrating the torque transfer parts associated therewith, and the locomotive body removed.
Figure 2:
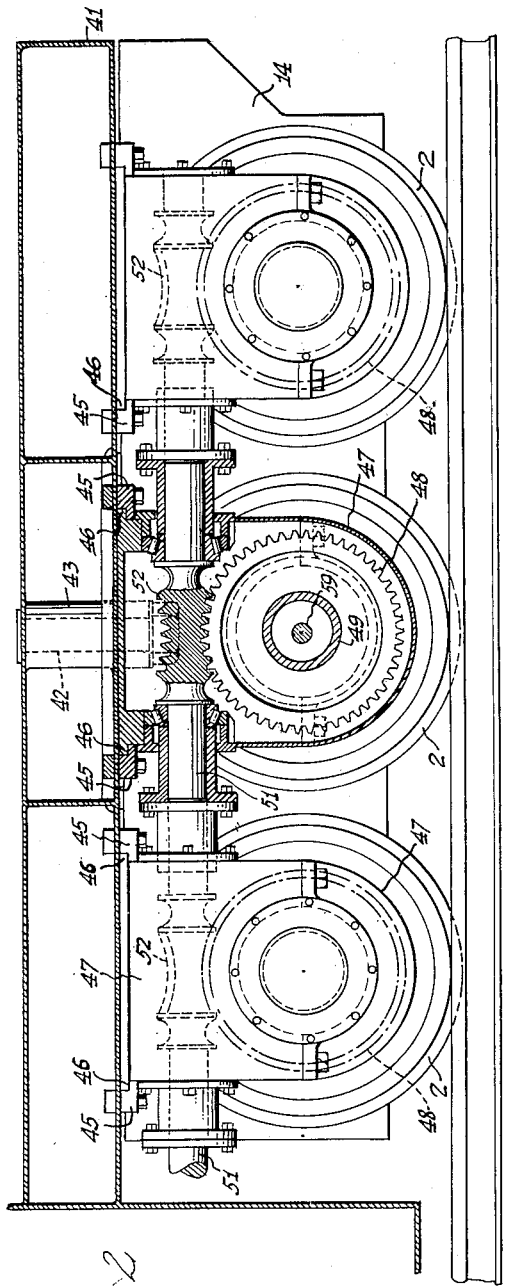
Fig. 2 is a side elevation with parts broken away and in cross section.

The numeral 1 designates wheels upon which the entire mechanism to be described is ultimately supported, the wheels preferably being formed hollow in order to reduce their weight, and equipped with tires 2 in order that they may roll on rails 3. The particular embodiment illustrated shows three sets of wheels but it is obvious that the number of wheels may be increased or decreased to provide adequate support for larger or smaller locomotives. Each wheel 1 has an integral stub axle 4, and the wheels on opposite sides of the truck are arranged in sets with the axles of opposed sets held in co-axial alignment by a sleeve-like axle casing 5 into which they extend. Each wheel 1 has a shoulder 6, and bearings 12 are interposed between the ends of the casing 5 and the adjacent shoulder 6, the casing thus serving as means for maintaining the wheels in axial alignment and also as means for spacing the wheels so that they may roll along the rails 3.

The casing 5 has still another function in that it serves to prevent separation of a set of wheels. For this purpose the casing 5 is provided with a pair of spaced internal grooves 7 intermediate its ends. Each stub axle 4 is provided with grooves 8 adjacent their ends, and when the stub axles are inserted in the casings 5 the grooves 7 and 8 register. To lock the stub axles 4 so that they cannot move longitudinally relative to the casing and thus permit spreading of the wheels there is provided spring-like split rings 9 that are normally received in the grooves 7 to project into the grooves 8, set-screws 10 being provided to contract the rings 9 into the grooves 8 during assembling or dismantling operations.

The body of the truck, with the objects of reducing weight and providing durability in view, is preferably made up of a plurality of flat shapes welded together and comprises a top plate or platform 13 having a pair of spaced longitudinally extending walls 14 and 15 welded thereto and depending therefrom adjacent the longitudinal edges thereof. Transverse walls 16 are welded to the ends of the longitudinal walls 14 and 15 and a bottom plate 17 is welded to the bottoms of walls 14, 15 and 16 to complete a box-like construction. Transverse webs 18 are mounted in spaced relation and intermediate the two end walls 16, the webs being welded to the underside of the platform 13, to the walls 14 and 15, and having their terminals spaced above the bottom plate 17.

In the center of the platform 13 is provided a pierced boss 19 having reinforcing ribs 20 welded thereto, the ribs also being welded to the platform 13 and to opposite walls 15, to strengthen the latter and to lend rigidity thereto. Opposite walls 15 are further reinforced and tied together by transversely extending webs 21 whose opposite ends are welded to opposite walls 14, whose upper edges are welded to the underside of the platform 13, and which are reinforced by certain of the ribs 20 that are connected to the pierced boss 19.

Openings are provided in the bottom plate 17 and the openings are ordinarily closed by cover plates 22 that are held in place by removable fastenings 23, there being one of such openings adjacent each wheel. Vertical guides 24 are secured adjacent the sides of the openings and are in the form of plates that are welded to the bottom plate 17 and which extend transversely between and are welded to walls 14 and 15. Slidably received between side walls 14 and 15 and each pair of vertical guides 24 is a block 25 in which the bearing 12 is mounted. Thus it becomes apparent that each wheel is supported by means of frictionless bearings in a block 25 which is slidable vertically between one of the sets of walls 14 and 15.

As shown in Figures 12 and 13, wear plates 26 may be interposed between the walls 24 and the blocks 25, the wear plates preferably being channel shaped and secured against lateral movement by the side walls 14 and 15 which are provided with openings 27 through which the wheel axles extend. Shields 28 are secured on each side of the blocks 25 and one of the shields adjacent each block is provided with a lubricant container 29 for receiving lubricant for the bearings 12, the shields preferably being mounted within the confines of the walls 14 and 15.

Figure 3:
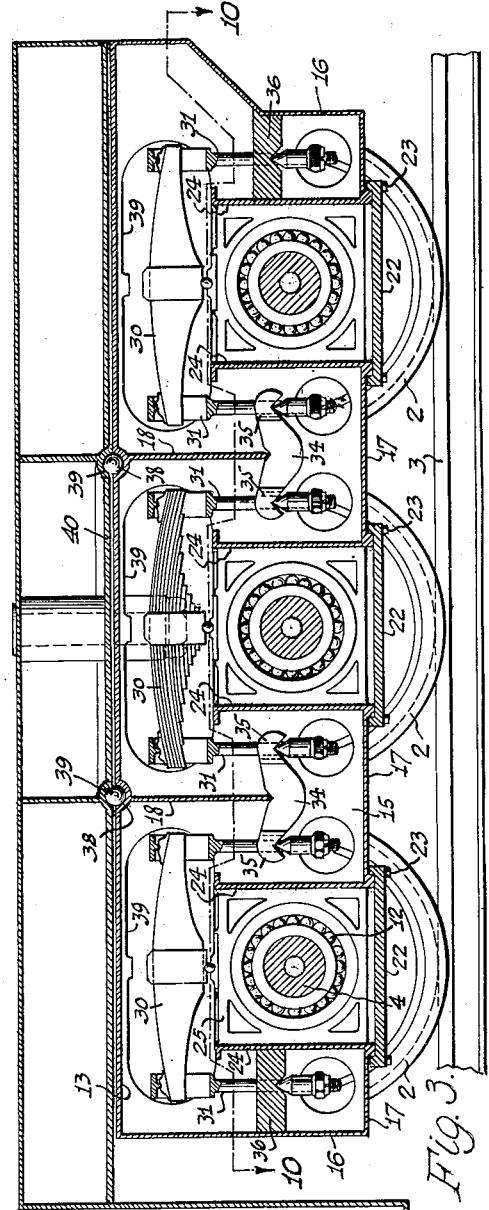
Fig. 3 is a longitudinal vertical section taken on the line 3—3 of Figure 1.

The spring suspension for supporting the body of the truck on the wheels, or the blocks 25 associated with the wheels is illustrated in Fig. 3 and includes a leaf spring 30 rockably engaging each block 25. Depending from the outer end of each spring is a link 31, the links being free to move pivotally relative to the springs. Each link has a pair of abutments 32, (see Fig. 14), on opposite sides adjacent the lower end thereof, the abutments being adjustable through means 33. Levers 34 are fulcrumed on the terminals of the webs 18 and have forked ends 35 engaged by the abutments 34. The links 31 on the ends of the springs remote from the webs 18 engage the underside of member 36.

It becomes apparent, therefore, that the weight of the truck body is transmitted to the springs 30 through the terminals of the webs 18 and the members 36 to the links 31 which are adjustably secured to the ends of the springs. The entire spring assembly is enclosed within a box-like construction defined by walls 14, 15 and 16 and may be easily inspected through openings 37 that are provided for that purpose, for the purpose of certain adjustments, and for the purpose of removing certain of the parts.

Surrounding and concentric with the pierced boss 19 is formed a bearing groove 38 that cooperates with a similar groove 39 in the base plate 40 of a locomotive body 41. A king pin 42 is received as at 43 in the locomotive body and in the pierced boss 19 of the truck body, ball bearings 44 being received in the grooves 38 and 39 to permit relative rotation of the locomotive body and the truck body.

As illustrated in Fig. 4 the locomotive body extends outwardly on each side of the wheels 1 and mounted on the underside of the base plate 40 are mounted gibs 45, there being a pair of such gibs in line with each wheel to receive flanges 46 on a casing 47 to secure the same to the base plate 40. In each casing 47 is provided a worm gear 48 having a hub 49 rotatably journalled in bearings 50, a drive shaft 51 extending through all of the casings 47 and having a plurality of worms 52 thereon to mesh with each of the worm gears 48. A shaft 51 is provided on opposite sides of the locomotive to rotate the worm gears 48 in the casings on opposite sides thereof and the power plant for rotating the shafts is designated at 53.

In the hub 49 of each worm gear is formed a plurality of grooves 54 and slidably received in each groove is a block 55 having a semi-spherical depression 56 receiving one-half of a ball 57, the other half of each ball being received in a similar depression in a head 58 on a shaft 59. As clearly shown in Fig. 9, each block 55 is independently movable relative to the other blocks. In this manner the shaft 59 is connected to the hub 49 by a slidable universal joint. The opposite end of the shaft 59 has a head 60 provided with depressions for receiving balls 61, and blocks 62 are slidably mounted in the hubs of the wheels 1, each block having a depression receiving one of the balls 61 and each block being movable independently of the others. As shown more clearly in Fig. 11 a clearance is provided at each end of each block to permit such longitudinal movement. In this manner the worm gears 48 are connected to adjacent wheels 1 to transmit power from the drive shafts 51 to the wheels through a member that rotates with its axis in direct alignment with the axis of rotation of the wheels 3, and in a manner permitting movement of the wheels vertically or horizontally without disturbing the driving connection.

The above described construction provides a locomotive truck wherein the wheels on opposite sides thereof may be separately or simultaneously driven, which is light and durable, wherein all the parts are protected from dirt and the elements and adequate lubrication provided for, and wherein the parts are accessible for inspection and may easily be dismantled for repairs.

Although a specific embodiment of the present invention has been illustrated and described it is to be understood that various changes may be made without departing from the spirit of the invention, and such changes are contemplated.

What I claim is:—

1. In a railway truck, independently rotatable wheels on said truck, a drive member associated with each wheel, means for supporting said drive member independently of said truck, said means including rigid elements for preventing displacement of said member in a direction at right angles to the normal plane of the axes of the wheel and being releasable to permit displacement thereof in a direction parallel to the axis of the wheel, and a slidable universal connection between each drive member and each wheel.

2. In a railway truck, independently rotatable wheels on said truck, a rotatable drive member associated with each wheel, means for supporting said drive member independently of said truck with its axis of rotation in direct alignment with the axis of rotation of the wheel, said means including rigid elements for preventing displacement of said member in a direction at right angles to the normal plane of the axes of the wheel and being releasable to permit displacement thereof in a direction parallel to the axis of the wheel, and a connector between said drive member and said wheel.

3. In a railway truck, independently rotatable wheels on said truck, a rotatable drive member associated with each wheel, means for supporting said drive member independently of said truck with its axis of rotation in direct alignment with the axis of rotation of the wheel, said means including rigid elements for preventing displacement of said member in a direction at right angles to the normal plane of the axes of the wheel and being releasable to permit displacement thereof in a direction parallel to the axis of the wheel, and a slidable universal connection between said drive member and said wheel.

4. In a railway truck, a pair of opposed wheels, axles extending inwardly therefrom, means for receiving said axles to maintain said wheels in definite spaced relation and in co-axial alignment, spring suspension means supporting said truck on said axles, a drive member associated with each wheel, means for supporting said drive member independently of said truck, said means including rigid elements for preventing displacement of said member in a direction at right angles to the normal plane of the axes of the wheel and being releasable to permit displacement thereof in a direction parallel to the axis of the wheel, and a slidable universal connection between each wheel and its associated drive member.

5. A locomotive including a body supported by trucks, each truck having a plurality of independently rotatable wheels, a rotatable drive member means rigidly mounted on said locomotive body separate from said trucks adjacent each wheel for supporting said drive member with its axis of rotation in direct alignment with the axis of rotation of the wheel, and means for connecting said drive member to said wheel.

6. A locomotive including a body supported by trucks, each truck having a plurality of independently rotatable wheels, a rotatable drive member means rigidly mounted on said locomotive body separate from said trucks adjacent each wheel for supporting said drive member with its axis of rotation in direct alignment with the axis of rotation of the wheel, a shaft, a slidable universal joint between said shaft and said drive member, and a slidable universal joint between said shaft and wheel.

7. In a device of the character described, a truck having wheels mounted to rotate independently relative to one another, a body carried by said truck, gibs mounted on said body adjacent to said wheels, housings supported in said gibs, said gibs supporting said housings rigidly and being releasable to permit movement thereof in one direction, torque transfer members mounted in said housings, and means for universally connecting said torque transfer parts to the adjacent wheels.

8. In a device of the character described, a truck having a body mounted thereon to move relative thereto, a pair of wheels having axle spindles formed thereon, a sleeve receiving said axle spindles and maintaining them in co-axial alignment, means in said sleeve for preventing endwise movement of said axle spindles relative thereto, spring suspension means including bearings rotatably receiving said axle spindles, torque transfer elements, means rigidly mounted on said body for supporting said torque transfer elements independently of said truck, said supporting means being releasable to permit separation of said torque transfer parts from said wheel and means for universally connecting each of said torque transfer elements to one of said wheels.

9. In combination, a truck, a body on said truck, wheels mounted on said truck, torque transfer members including a rotatable element, means attached to said body for supporting said rotatable element substantially in co-axial alignment with one of said wheels, a connector comprising a rod formed with heads on the ends thereof, said heads being disposed in recesses in said wheel and rotatable element respectively, sets of individually slidable blocks mounted in ways in said recesses in said wheel and rotatable elements, said blocks and said heads having depressions formed therein, and balls mounted in the depressions in said heads with each ball extending into a depression in an adjacent block.

EDWARD GRAY.